US012049675B2

(12) United States Patent
Gaulin

(10) Patent No.: US 12,049,675 B2
(45) Date of Patent: Jul. 30, 2024

(54) SYSTEM TO PRODUCE CONCENTRATE MAPLE SAP AND ASSOCIATED METHOD

(71) Applicant: H2O INNOVATION INC., Québec (CA)

(72) Inventor: Rock Gaulin, Sherbrooke (CA)

(73) Assignee: H2O INNOVATION INC., Québec (CA)

(*) Notice: Subject to any disclaimer, the term of this patent is extended or adjusted under 35 U.S.C. 154(b) by 466 days.

(21) Appl. No.: 17/348,848

(22) Filed: Jun. 16, 2021

(65) Prior Publication Data

US 2021/0395842 A1    Dec. 23, 2021

Related U.S. Application Data

(60) Provisional application No. 63/041,137, filed on Jun. 19, 2020.

(51) Int. Cl.
| | | |
|---|---|---|
| *C13B 25/00* | (2011.01) | |
| *A23L 5/20* | (2016.01) | |
| *A23L 27/10* | (2016.01) | |
| *B01D 1/06* | (2006.01) | |
| *B01D 5/00* | (2006.01) | |
| *B01D 61/36* | (2006.01) | |
| *B01D 63/06* | (2006.01) | |
| *B01D 69/04* | (2006.01) | |
| *C13B 20/16* | (2011.01) | |

(52) U.S. Cl.
CPC ............... *C13B 25/00* (2013.01); *A23L 5/21* (2016.08); *A23L 27/10* (2016.08); *B01D 1/06* (2013.01); *B01D 5/0045* (2013.01); *B01D 5/006* (2013.01); *B01D 5/0072* (2013.01); *B01D 61/362* (2013.01); *B01D 63/069* (2022.08); *B01D 69/04* (2013.01); *C13B 20/165* (2013.01); *A23V 2002/00* (2013.01); *B01D 2313/24* (2013.01)

(58) Field of Classification Search
CPC ....... C13B 25/00; C13B 20/165; C13B 20/16; A23L 5/21; A23L 27/10; B01D 1/06; B01D 5/0045; B01D 5/006; B01D 5/0072; B01D 61/362; B01D 63/069; B01D 69/04; B01D 2313/24; B01D 3/106; B01D 3/145; A23V 2002/00
USPC ........................................................ 127/55
See application file for complete search history.

(56) References Cited

U.S. PATENT DOCUMENTS

| | | | | |
|---|---|---|---|---|
| 4,159,210 A | * | 6/1979 | Chen ....................... | C13B 10/00 127/29 |
| 9,622,505 B2 | * | 4/2017 | Gaulin ..................... | C13B 25/00 |
| 2017/0114423 A1 | * | 4/2017 | Rowe .................... | C13B 50/006 |

FOREIGN PATENT DOCUMENTS

| | | | | | |
|---|---|---|---|---|---|
| CN | 103880263 A | * | 6/2014 | ............ | Y02W 10/20 |
| JP | 2016203078 A | * | 12/2010 | ............. | B01D 71/02 |

OTHER PUBLICATIONS

Translation of Maekawa (JP-2016203078-A) (Year: 2016).*
Translation of Wang (CN-103880263-A) (Year: 2014).*

* cited by examiner

*Primary Examiner* — Ekandra S. Miller-Cruz
(74) *Attorney, Agent, or Firm* — NORTON ROSE FULBRIGHT CANADA LLP

(57) ABSTRACT

The process of producing concentrated maple sap can include concentrating the maple sap using membrane filtration to a sugar content of approximately 30° Brix, circulating the maple through a maple sap passage of a membrane, wherein the membrane contains the maple sap in a vacuum cavity, and evaporating the water from the maple sap across (Continued)

the membrane into the cavity. The concentrated maple sap having a sugar content above 50° Brix.

26 Claims, 6 Drawing Sheets

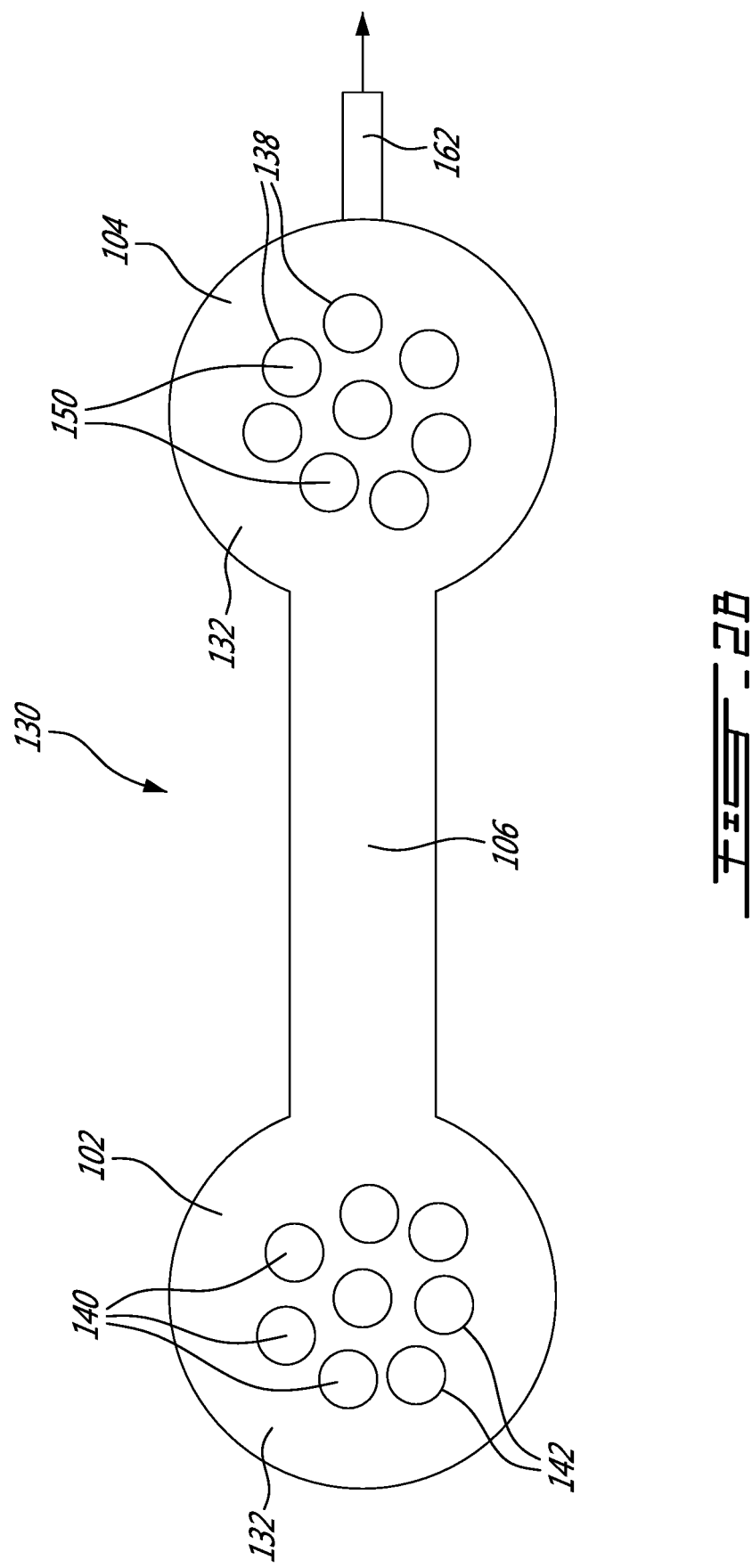

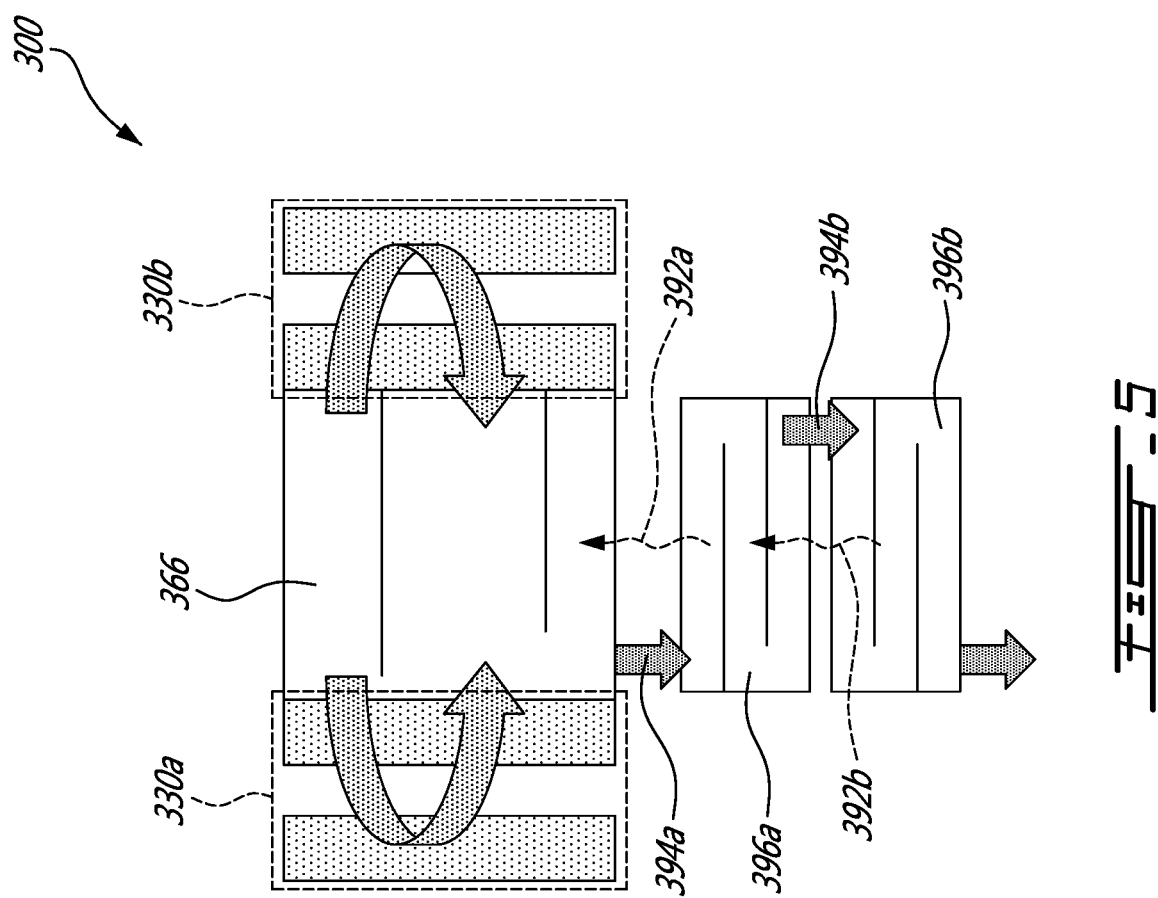

SYSTEM TO PRODUCE CONCENTRATE MAPLE SAP AND ASSOCIATED METHOD

FIELD

The improvements generally relate to the field of maple products, more specifically to the production of concentrated maple sap.

BACKGROUND

Fresh maple sap contains between 1 and 3° Brix, for instance, at the time of harvesting, and is typically transformed by concentration before being used as a food product, typically to a syrup having over 60° Brix. Maple syrup, for instance, is a very popular maple product, which is produced by concentrating fresh maple sap to 65-67° Brix, typically exactly 66° Brix. The final stage of concentration is typically performed by a flat pan evaporator which can also caramelize some of the sugars. Another example maple product is maple sugar which is typically produced by drying a syrup which can be concentrated to 70 Brix or more before drying. Traditionally, the concentration process was entirely done through evaporation, using a system such as shown at the bottom portion of FIG. 1: an evaporator 10 including a sequence of a folded pan evaporator 12 and flat pan evaporator 14. Evaporating via pans 12, 14 requires a relatively large amount of energy, especially in the earlier stages of concentration, where a greater volume of water is present in the solution. In an effort to reduce the energy and costs associated to evaporation, membrane filtration methods 16, as shown in the top portion of FIG. 1 for instance, where the fresh maple is fed 18 under pressure along a membrane 20 and filtrate 22 is extracted across the membrane 20, have been used upstream of the pan evaporators 12, 14.

In practical applications, there was a limit in terms of the amount of sugar content achievable with membrane filtration 16, above which the membrane 20 experienced clogging. Patent publication U.S. Pat. No. 9,622,505 disclosed a technology which went one step further, by adapting the pressure as a function of varying sugar content, and allowed to increase sugar content achievable by membrane filtration to above 30 Brix, and even allowing to remove the requirement for a folded pan stage 12 entirely.

While the technology presented in Patent publication U.S. Pat. No. 9,622,505 met a significant amount of commercial success, there always remains room for improvement.

SUMMARY

In particular, even though the technology described in U.S. Pat. No. 9,622,505 allowed to increase the sugar content achievable with membrane filtration 16, thereby generating substantial energy efficiency gains, there remained a limit in terms of achievable sugar content. Moreover, it remained desirable to simplify the required equipment.

Membrane technology described in U.S. Pat. No. 9,622,505 involved using the membrane 20 somewhat as filter, with pressurized maple sap in liquid state on one side of the filter, and water extracted from the pressurized maple sap on the other side of the filter. It was found that sugar content of maple sap could continue to be increased in a higher sugar content range in a suitable way by sustaining a gaseous state on the other side of the filter, and more specifically by sustaining a vacuum to drive evaporation of water across the membrane, and then condensing the extracted water. With this latter technology, maple sap having a concentration of 25 or 30 Brix was successfully concentrated to above 50 Brix.

Several challenges required to be overcome in order to pursue the research and development efforts. For instance, maple sap can lose its freshness relatively fast, and the maple sap harvesting season is typically quite short. In order to broaden the possibilities of performing experiments on maple sap transformation, some preliminary tests were done using maple sap having a sugar concentration of approximately 30° Brix until favourable results were achieved, increasing the likelihood of success of the confirmation experiments conducted during the actual maple sap harvesting season.

In accordance with one aspect, there is provided a process of increasing a sugar concentration of maple sap, the process comprising circulating maple sap in liquid state at a certain temperature along a first side of a membrane, sustaining a gaseous state at a pressure below atmospheric pressure on a second side of the membrane and evaporating water from the maple sap across the membrane, thereby increasing the sugar concentration of the maple sap.

In accordance with another aspect, there is provided a system for increasing a sugar concentration of maple sap, the system comprising a maple sap source providing maple sap, at least one membrane filtration stage connected to receive the maple sap from the maple sap source and operable to concentrate the maple sap to a intermediary sugar concentration and a vacuum separator having a membrane partitioning a maple sap passage from a vacuum cavity, the vacuum cavity having a condenser surface, a pump configured to circulate the intermediary sugar concentration maple sap along the maple sap passage, a vacuum pump fluidly connected to the vacuum cavity, the membrane being configured to contain the maple sap in liquid form in the maple sap passage while allowing evaporation of water from the maple sap passage into the vacuum cavity to condense against the condenser surface.

In accordance with another aspect the system for increasing a sugar concentration of maple sap above is provided, further comprising a flat pan evaporator stage connected to the maple sap passage to directly receive a concentrated maple sap from the vacuum separator.

In accordance with another aspect the system for increasing a sugar concentration of maple sap is provided, wherein said vacuum separator is a first vacuum separator and further comprises a second vacuum separator having a second membrane partitioning a second maple sap passage from a second vacuum cavity, the second vacuum cavity having a second condenser surface, the pump further configured to circulate a concentrated maple sap from the maple sap passage of the first vacuum separator along the second maple sap passage, the vacuum pump fluidly connected to the second vacuum cavity, the second membrane being configured to contain the concentrated maple sap in liquid form in the second maple sap passage while allowing evaporation of water from the second maple sap passage into the second vacuum cavity to condense against the second condenser surface.

In accordance with another aspect the system for increasing a sugar concentration of maple sap is provided, wherein said vacuum separator is a first vacuum separator and further comprises a second vacuum separator parallel to the first vacuum separator having a second membrane partitioning a second maple sap passage from a second vacuum cavity, the second vacuum cavity having a second condenser surface, the pump further configured to circulate the intermediary sugar concentration maple sap along the second maple sap passage, the vacuum pump fluidly connected to the second vacuum cavity, the second membrane being configured to contain the concentrated maple sap in liquid form in the second maple sap passage while allowing evaporation of water from the second maple sap passage into the second vacuum cavity to condense against the second condenser surface.

In accordance with yet another aspect the system for increasing a sugar concentration of maple sap above is provided, wherein the vacuum cavity is fluidly connected to the vacuum pump via the intermediary of a container, the container configured to receive condensate from the vacuum separator and prevent the condensate from reaching the vacuum pump.

In accordance with yet another aspect the system for increasing a sugar concentration of maple sap above is provided, wherein the container further contains a heat exchanger configured to circulate a coolant within the container.

In accordance with yet another aspect the system for increasing a sugar concentration of maple sap is provided, wherein the maple sap source is a fresh maple sap source.

Many further features and combinations thereof concerning the present improvements will appear to those skilled in the art following a reading of the instant disclosure.

DESCRIPTION OF THE FIGURES

In the figures,

FIG. 2B is a top schematic view of the cut 2B-2B of the vacuum separator of the maple sap concentration plant of FIG. 2A;

FIG. 5 is a schematic view of another alternate embodiment of a maple sap concentration plant, having two vacuum separator in parallel.

DETAILED DESCRIPTION

Figure 2A:
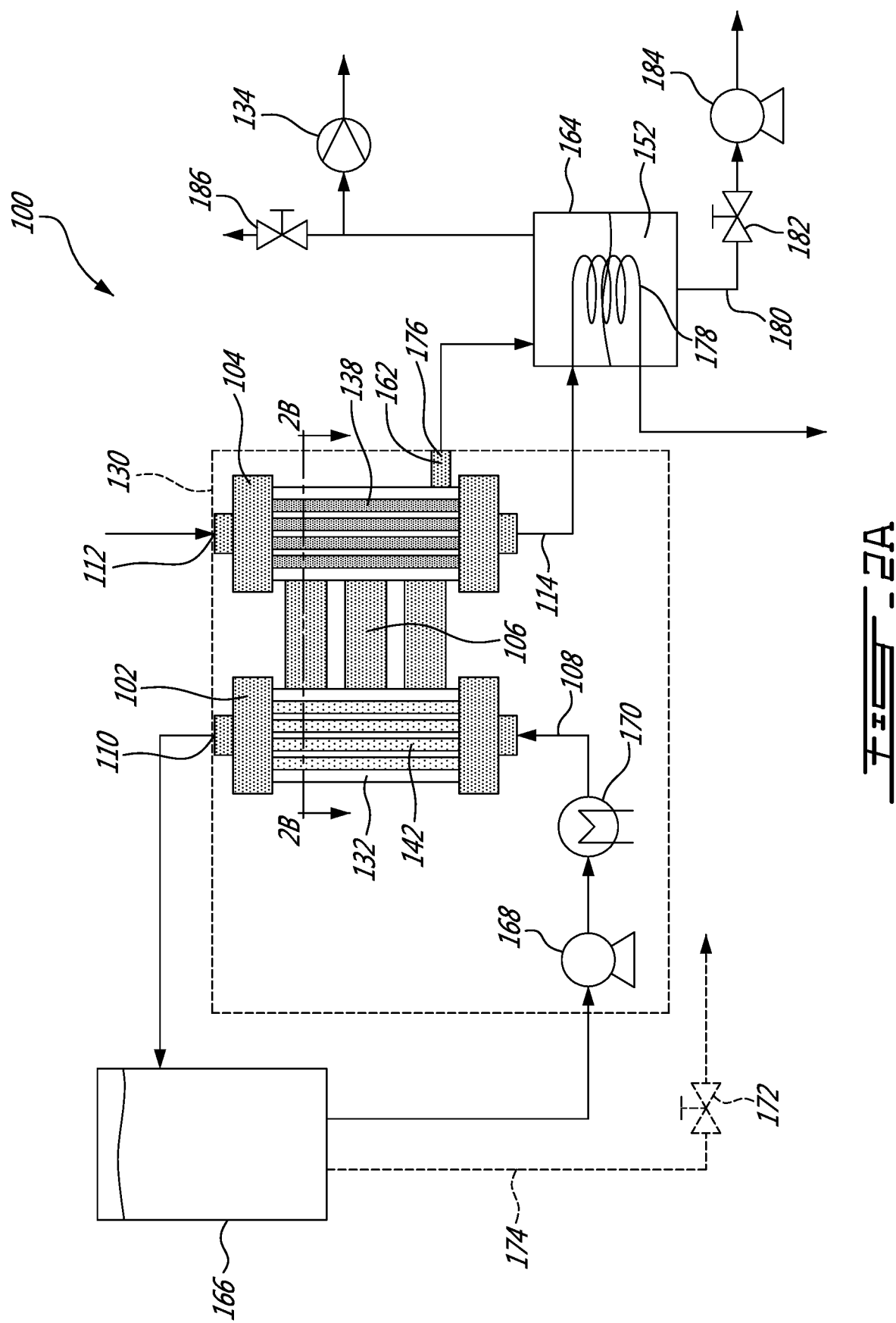
FIG. 2A is a schematic view of a maple sap concentration plant having an embodiment of a vacuum separator.

FIG. 2A shows an example maple sap concentration plant 100, having a vacuum separator 130 which may be used to increase the sugar concentration of maple sap. In this example, the vacuum separator 130 may be a shell, defining an inner vacuum cavity 132. The vacuum separator 130 can have two stages, an evaporator stage 102 and a condenser stage 104, connected to each other via ducts 106. The vacuum separator 130 may contain a plurality of tubular membranes 142 defining the maple sap passage 140 within, from the maple sap inlet 108 to the maple sap outlet 110, and extending within the vacuum cavity 132 of the evaporator stage 102. Similarly, the vacuum separator 130 further contains a plurality of tubular condenser surfaces 138 defining the coolant passage 150 within, from a coolant inlet 112 to a coolant outlet 114, and extending within the vacuum cavity 132 of the condenser stage 104. It is understood that the maple sap entering the evaporator stage 102 may be split amongst the plurality of tubular membranes 142 and recombined when exiting the vacuum separator 130. Similarly, the coolant may be split amongst the tubular condenser surfaces 138 and recombined as it exits the vacuum separator 130. In an alternate embodiment, the vacuum separator can have a single stage.

FIG. 2B shows a top schematic view of the section 2B-2B of vacuum separator 130 seen in FIG. 2A. In this embodiment, eight (8) tubular membranes 142, defining the maple sap passage 140, can be seen in the evaporator stage 102 and eight (8) tubular condenser surfaces 138, made of metal for instance and defining the coolant passage 150, in the condenser stage 104 of the vacuum separator 130. It is understood that, in alternate embodiments, the amount of membranes 142 and the condenser surfaces 138 may be altered without departing from the present disclosure. For instance, in some embodiments there may be one hundred (100) tubular membranes 142. In other embodiments, there may be only one (1) tubular membrane 142 and one (1) condenser surface 138, for instance.

Returning to FIG. 2A, the vacuum separator 130 may contain a vacuum cavity port 162 on the lower portion of the condenser stage 104, fluidly connecting the vacuum cavity 132 to a container 164. The container 164 can be fluidly connected to the vacuum pump 134 configured to create a vacuum in the container 164 and, correspondingly, in the vacuum cavity 132 of the vacuum separator 130.

Figure 3B:
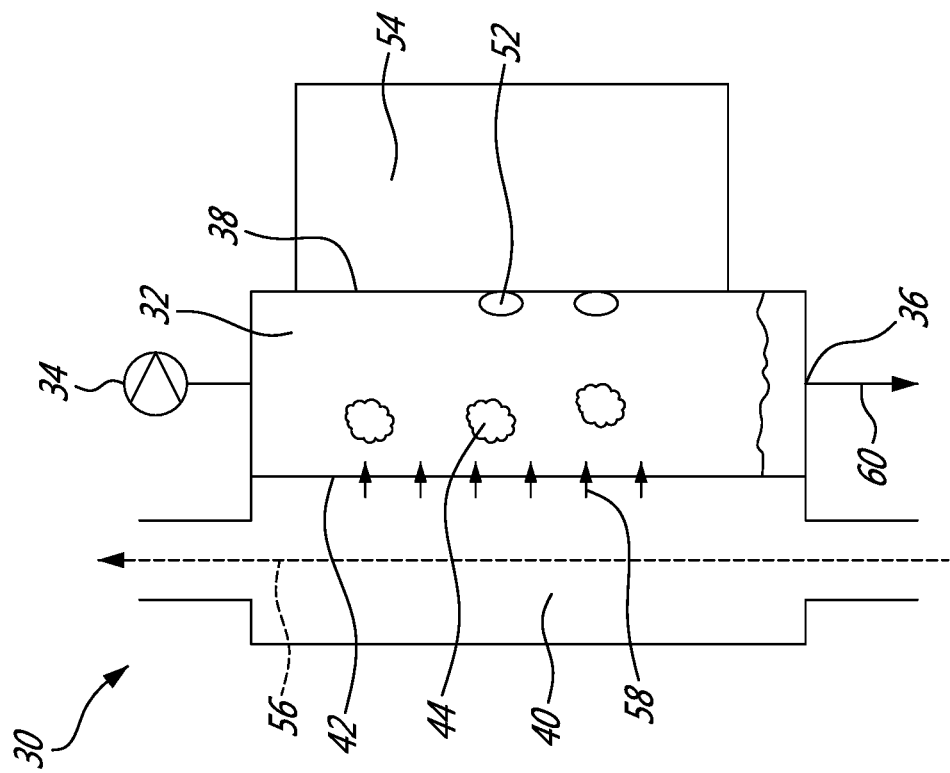
FIG. 3B is a schematic view of yet another embodiment of a vacuum separator for use in a maple sap concentration plant.
Figure 3A:
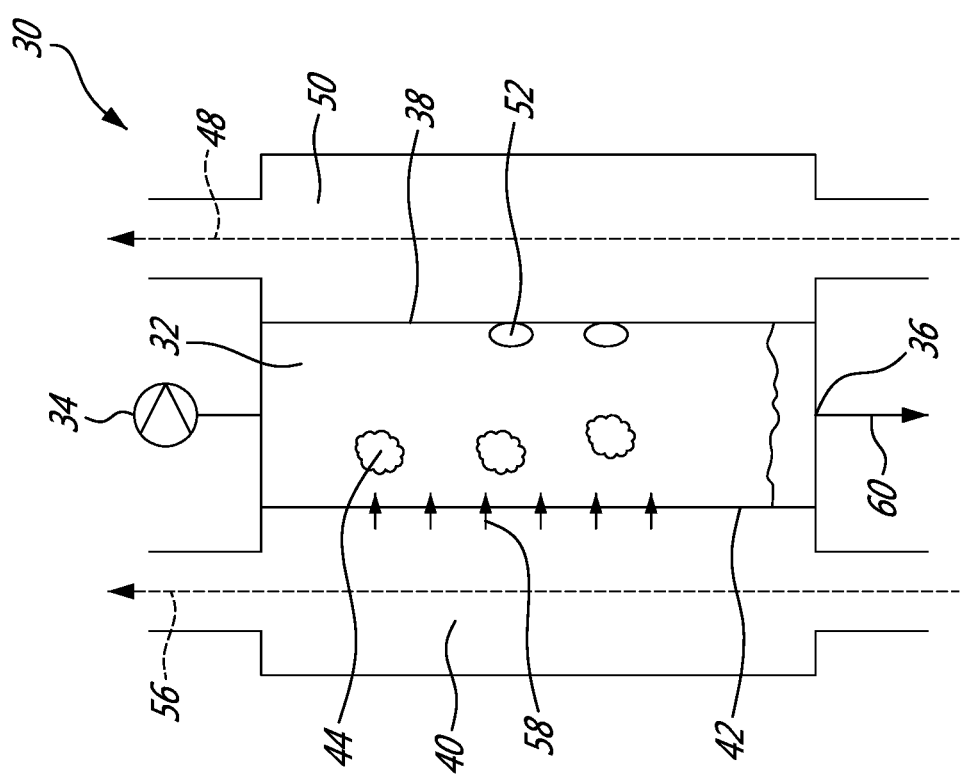
FIG. 3A is a schematic view of another embodiment of a vacuum separator for use in a maple sap concentration plant.

FIG. 3A presents a first schematized view of an example maple sap vacuum separator 30. The vacuum separator 30 may comprise a vacuum cavity 32 fluidly connected to a vacuum pump 34 and to a condensate outlet 36. The vacuum cavity 32 can further have a condenser surface 38 and a maple sap passage 40 within the vacuum cavity 32, separated by a porous membrane 42. The membrane 42 may be configured to receive maple sap along a first side corresponding to the maple sap passage 40, and capable of sustaining a pressure below atmospheric pressure on a second side corresponding to the vacuum cavity 32 of the vacuum separator 30.

As will be exemplified below, the condenser surface 38 is a cool surface on which vapours 44 may condensate. In the vacuum separator 30 shown in FIG. 3A, the condenser surface 38 may be cooled using a coolant, such as water cooled between 1 and 30° C., or between 1 and 10° C., for instance, circulated 48 through a coolant passage 50 in contact with a first face of the condenser surface 38, such that its temperature may be reduced to a point where condensate 52 can form on the second face of the condenser surface 38. In alternate embodiments, and as perhaps best seen in FIG. 3B, the condenser surface 38 may be cooled by alternate methods, such as by a cooling unit 54, for instance.

Returning to FIG. 3A, the vacuum separator 30 permits to increase the sugar concentration of maple sap by subjecting the second side of the membrane to a gaseous pressure lower than ambient pressure, preferably a vacuum of 25 in Hg or more, driving the evaporation 58 of water across the membrane and thereby increasing its sugar concentration. When in use, a pump (not shown) can circulate maple sap 56 through the maple sap passage 40 and against the membrane 42. Meanwhile, the vacuum pump 34 may subject the vacuum cavity 32 to a vacuum, reducing the vapour pressure of the gas in the vacuum cavity 32 below the vapour pressure level in the maple sap. While the membrane 42 sustains the vacuum found in the vacuum cavity 32, the water in the maple sap may be evaporated 58 through the membrane into the vacuum cavity 32. As will be exemplified below, it is understood that increasing the temperature of the maple sap in the maple sap passage 40 further benefits the process of water evaporating 58 through the membrane 42. Accordingly, a temperature increase may be applied simultaneously to the process described above without departing from the present disclosure.

The water vapour 44, now in the vacuum cavity 32, can condense on the cool condenser surface 38, where droplets of water, alternatively known as condensate 52, may form. The condensate 52, can run downwardly towards the base of the vacuum cavity 32, where it may be evacuated by flowing through a condensate outlet 36 towards a condensate drain 60.

It will be understood that the maple sap exiting the maple sap passage has a water content that is therefore lower than what it initially had when entering the maple sap passage, and thus contains an increased sugar concentration.

Referring back to FIG. 2A, the maple sap passage of the membrane 142 is fluidly connected to a reservoir 166 containing maple sap to be concentrated using the vacuum separator 130. In this particular embodiment, the maple sap initially in the reservoir 166 can be maple sap having been subject to membrane filtration, containing an initial sugar concentration of between 20 and 40° Brix, such as approximately 30° Brix. It is understood that in alternate embodiments, the maple sap can be initially concentrated by any other suitable method, such as folded pan evaporation for instance, without departing from the present disclosure. In alternate embodiments, the maple sap initially in the reservoir may be fresh maple sap.

When the vacuum separator 130 is in use, a pump 168 can circulate the maple sap from the reservoir 166 to a heating element 170 capable of heating the maple sap between 15 and 80° C. In this particular embodiment, and as further described below, the temperature is initially set between 25 and 30° C. and later increased between 40 and 50° C. It will be understood that the heating of the maple sap may be altered or omitted without departing from the present disclosure. For instance, in an alternate embodiment the temperature of the maple sap may be altered as a function of the initial sugar concentration of the maple sap. In yet another embodiment, the temperature may be continuous adjusted as a function of time since the concentration process has begun. In yet another embodiment, the heating element 170 may be omitted.

The heated maple sap may then be circulated to the maple sap passage in the evaporator stage 102. The fluid can be fed to the maple sap passage with an operating pressure of less than 100 psi, and preferably less than 30 psi. In this particular embodiment, and as will be discussed below, an operating pressure is initially between 5 and 15 psi and later increased between 20 and 30 psi. It will be understood that the operating pressure may be altered or omitted without departing from the present disclosure. For instance, in an alternate embodiment the operating pressure on the membrane 142 may be continuously altered as a function of time since the concentration process has begun.

At this point, the water from the maple sap in the evaporator stage 102 may evaporate through the membrane 142, as previously disclosed above, thereby increasing the sugar concentration of the maple sap. The concentrated maple sap can exit the maple sap passage of the membrane 142 via the maple sap outlet 110 and may be circulated back to the reservoir 166. The maple sap can circulate in a closed circuit, continuously going from the reservoir 166 to the vacuum separator 130 and back to the reservoir 166 until the desired maple sap sugar concentration is achieved, typically above 50° Brix, preferably above 60° Brix. At this point, the reservoir 166 can be drained by opening a valve 172 fluidly connected to a reservoir drain line 174. It will be understood that any suitable method of draining the reservoir 166 can be used without departing from the present disclosure.

In this particular example, maple sap having an initial sugar concentration of 30° Brix was used in the reservoir 166. The vacuum separator 130 was operated continuously with a vacuum of 28 inHg, a maple sap temperature between 25 to 30° C. and an operating pressure between 5 and 15 psi until the maple sap in the reservoir 166 reached a maple sap sugar concentration of approximately 45° Brix. The temperature was then increased between 40 and 50° C. with an operating pressure between 20 and 30 psi, while maintaining a vacuum of 28 inHg. The vacuum separator 130 was stopped when the maple sap in the reservoir 166 reached a sugar concentration of 64° Brix.

Still referring to FIG. 2A, during operation of the vacuum separator 130, the water vapour in the vacuum cavity 132 may condense on the condenser surfaces 138 and flows downwardly toward the bottom portion of the condenser stage 104, exiting the vacuum separator 130 via a condensate outlet 176, corresponding to the vacuum cavity port 162 in this embodiment, and collecting in the container 164. The connection between the vacuum pump 134 and the container 164 can be placed on the upper portion of the container, separate and spaced apart from the connection between the vacuum cavity 132 and the container 164, so as to prevent the introduction of condensate 152 into the vacuum pump 134.

In this example, the container 164 may further include a serpentine heat exchanger 178, fluidly connected in series to the coolant outlet 114 of the condenser stage 104. The serpentine heat exchanger 178 may receive the coolant from the condenser stage 104 of the vacuum separator 130 and cool any remaining water vapour in the container 164 as well as the condensate 152 collected, so as to decrease the water vapour reflux into the vacuum separator 130 and/or into the vacuum pump 134. It is understood that the serpentine heat exchanger 178 may be altered or omitted without departing from the present disclosure.

When the amount of condensate 152 in the container 164 reaches a predetermined level, a condensate drain line 180 can be used to empty the container 164. In this embodiment, the container 164 is fluidly connected to a condensate valve 182 and condensate pump 184. To evacuate the condensate 152 from the container 164, the condensate valve 182 may be opened and the condensate pump 184 turned on. It is understood that evacuating the condensate 152 can be done simultaneously to the application of the vacuum to the container 164 and vacuum cavity 132 or can be done after releasing the vacuum. In the later case, the vacuum may be released by opening a release valve 186 before opening the condensate valve 182 and turning on the condensate pump 184. In an alternate embodiment, the condensate pump 184 can be omitted, and the condensate 152 may be passively drained when the vacuum is released and the condensate valve 182 is opened.

In certain embodiments, the release valve 186 can be used as a flush valve, where it is occasionally opened and subsequently closed while the vacuum pump 134 is on, thus releasing and reapplying the vacuum in the container 164 and vacuum cavity 132. It was found that in some cases occasionally releasing and reapplying the vacuum accelerates the evaporation and condensation process.

Figure 4:
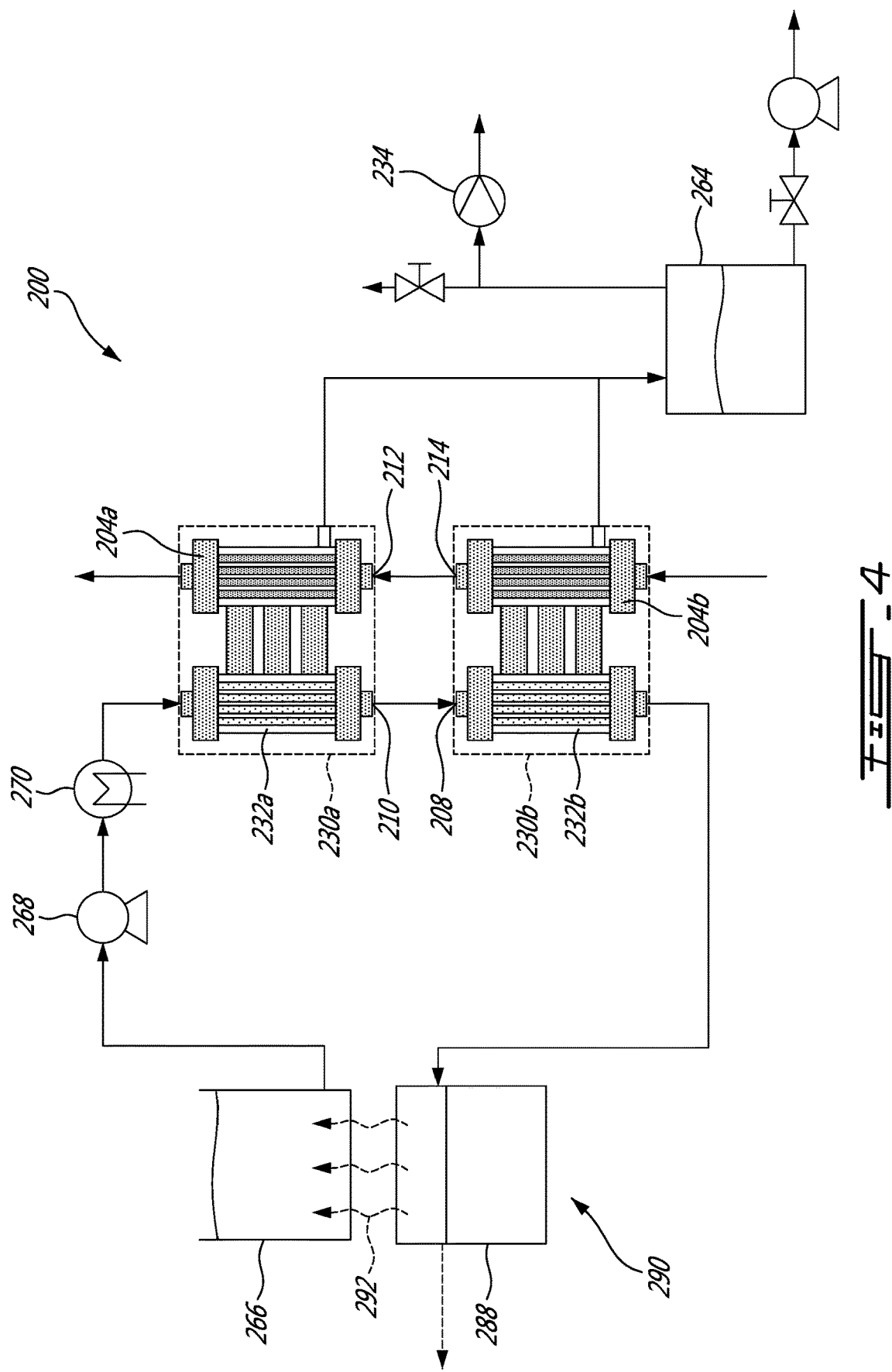
FIG. 4 is a schematic view of an alternate embodiment of a maple sap concentration plant, having two vacuum separators in series.

Attention is now brought to FIG. 4, showing another embodiment of a maple sap concentration plant 200 using two vacuum separators 230a, 230b, as described above, in series. In this example, contrarily to the embodiment shown in FIG. 2A, the maple from the reservoir 266 may not returned to said reservoir 266 after being concentrated by a first vacuum separator 230a, but may be fed to a subsequent vacuum separator 230b in series, wherein the maple sap exiting the last vacuum separator, in this embodiment the second vacuum separator 230b, can contain the desired sugar concentration. The vacuum separators 230a, 230b in this example may be fluidly connected to one another, such that the coolant output from the condenser stage of one vacuum separator is the input for the condenser stage of the following vacuum separator. In this particular example, the coolant can initially enter the coolant passage of a second vacuum separator 230b. The outlet 214 of the coolant passage of the second vacuum separator 230b may be fluidly connected to the inlet 212 of the coolant passage of the first vacuum separator 230a, thus circulating the coolant through the condenser stage 204b of the second vacuum separator 230b and subsequently through the condenser stage 204a of the first vacuum separator 230a.

Similarly, in this example, the pump 268 can circulate the maple sap from the reservoir 266 to the maple sap passage of the first vacuum separator 230a, where the maple sap may be concentrated to a first sugar concentration. The maple sap outlet 210 of the first vacuum separator 230a can be fluidly connected and circulated to the maple sap inlet 208 of the second vacuum separator 230b, where the maple sap may be further concentrated to a second, higher, sugar concentration, corresponding to the desired sugar concentration. It is understood that additional vacuum separators can be subsequently added in series without departing from the present disclosure.

Figure 1:
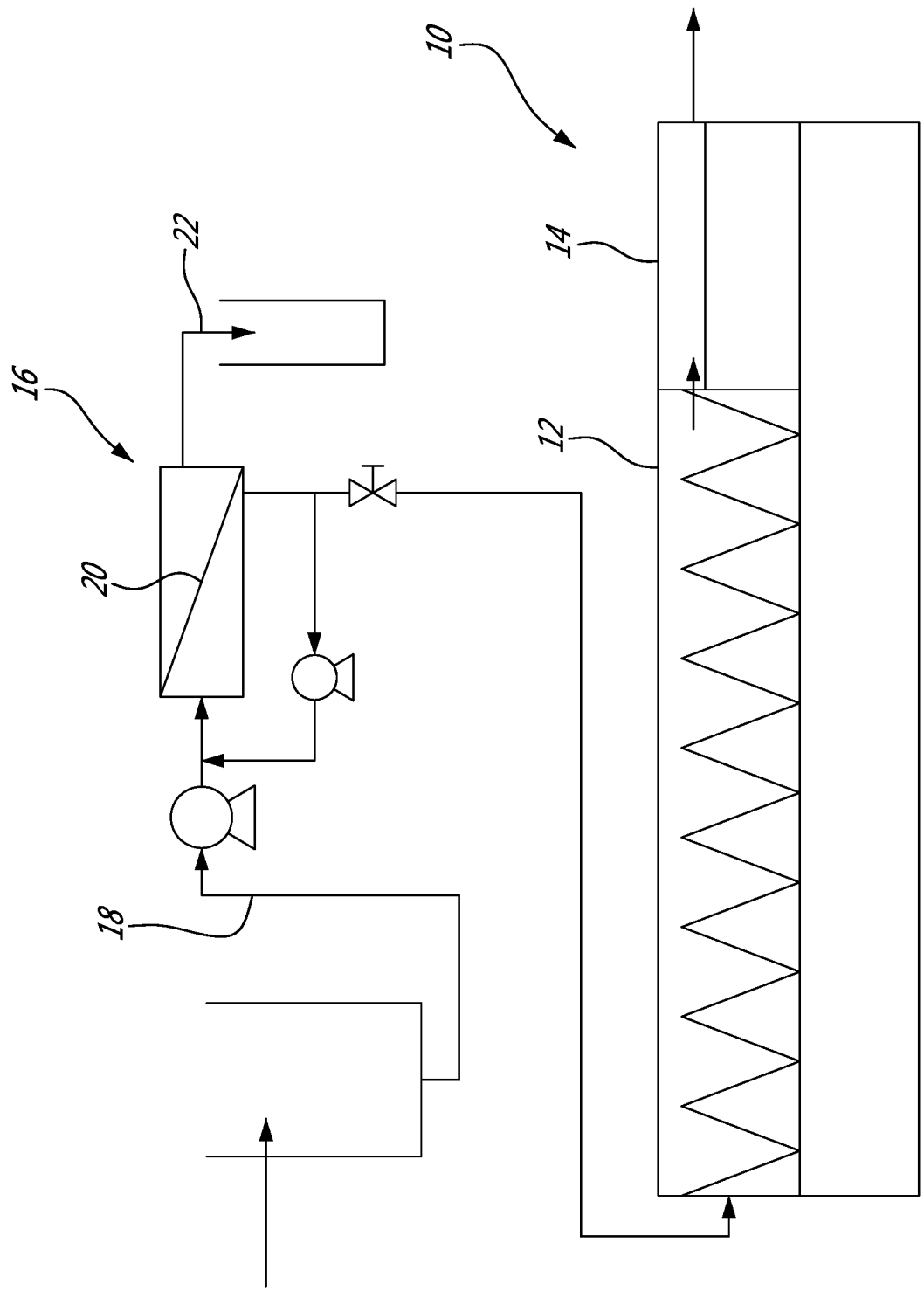
FIG. 1 is a schematic view of an example of a maple sap concentration plant having a single membrane filtration stage, in accordance with the prior art.

In this embodiment, the maple sap concentration plant 200 may further contain a flat pan evaporator 288, permitting the transformation of concentrated maple sap to a final product, such as maple syrup, for instance. As seen in FIG. 4, and contrarily to the method seen in FIG. 1, the concentrated maple sap may be fed directly to a flat pan evaporator stage 290, in the sense that the presence of a folded pan evaporator stage is entirely omitted. The expression 'directly', in this context, can be understood to mean 'without an intermediate sugar-content-increasing stage'. The flat pan evaporator 288 can be configured such that the vapour 292 generated by the evaporating process, and its associated heat, may be used to at least partially heat the maple sap in the reservoir 266. In this specific example, part of the energy invested in the flat pan evaporation stage 290, and its associated cost, can be recuperated by reducing the amount of heating required by the heating element 270 before circulating the maple sap into the vacuum separators 230a, 230b.

It is understood that the evaporation step can be altered or omitted without departing from the present disclosure. For instance, in an alternate embodiment, the second concentrated maple sap is used as is. In yet another embodiment, the flat pan evaporator 288 pan is not used to heat the reservoir 266.

Still referring to FIG. 4, one may note that the first 230a and second 230b vacuum separators are fluidly connected to a single container 264 and vacuum pump 234, where the vacuum pump 234 may supply the vacuum for the vacuum cavities 232a, 232b of both vacuum separators 230a, 230b. It will be understood that in an alternate embodiment, each vacuum separator may contain a separate container 264 and/or a separate vacuum pump 234, for instance. In yet another alternate embodiment, each vacuum cavity 232a, 232b may be subject to different pressures below atmospheric pressure. It can be further noted that, in this embodiment, a single pump 268 and heating element 270 can be used to circulate maple sap through both vacuum separators 230a, 230b. It will be understood that in alternate embodiments, additional pumps 268 and heating elements 270 may be present between the vacuum separators 230a, 230b.

Attention is now brought to FIG. 5 showing a schematic view of yet another embodiment of a maple sap concentration plant 300. In this embodiment, a pump (not shown) can circulate maple sap from the reservoir 366 towards two vacuum separators 330a, 330b in parallel and, similarly to the embodiment shown in FIG. 2A, may return the concentrated maple sap to the reservoir 366. The maple sap can be continuously circulated through the vacuum separators 330a, 330b, gradually increasing the sugar concentration of the maple sap in the reservoir 366 until it reaches a desired sugar concentration.

In this particular embodiment, once the maple sap reaches the sugar concentration desired, the concentrated maple sap may be transferred 394a to a first evaporator 396a. The first evaporator 396a may be placed under the maple sap reservoir 366, such that its vapours 392a and its associated heat can be used to heat the maple sap in the reservoir 366. The maple sap may then be further transferred 394b from the first evaporator 396a to a second evaporator 396b, where its vapour 392b and associated heat can be used to heat the first evaporator 396a and further heat the maple sap reservoir 366.

It will be understood that the evaporators 396a, 396b may be altered or omitted without departing from the present disclosure. For instance, in an alternate embodiment the second evaporator 396b can be omitted. In yet another embodiment, the evaporators 396a, 396b are omitted altogether and a heating element (not shown) may be used to heat the maple sap in the reservoir 366.

As can be understood, the examples described above and illustrated are intended to be exemplary only. The scope is indicated by the appended claims.

What is claimed is:

1. A process of increasing a sugar concentration of maple sap, the process comprising:
   removing gas from a cavity on a second side of a membrane to cause a pressure below atmospheric pressure on the second side of the membrane, wherein the second side is a gaseous phase;
   circulating maple sap in liquid state along a first side of the membrane; and
   evaporating water from the maple sap across the membrane, thereby increasing the sugar concentration of the maple sap.

2. The process of claim 1, wherein the sugar concentration of the maple sap is of at least 25° Brix before said circulating the maple sap along the first side of the membrane.

3. The process of claim 1, further comprising concentrating fresh maple sap having a sugar concentration between 1 and 3° Brix to concentrated maple sap having at least 20° Brix, wherein said concentrated maple sap is said circulated maple sap.

4. The process of claim 3, wherein said concentrating includes pressurizing said maple sap upstream of the membrane.

5. The process of claim 1, including increasing the sugar concentration of the maple sap to above 50° Brix by said steps of circulating, and evaporating.

6. The process of claim 5, including increasing the sugar concentration of the maple sap to above 60° Brix by said steps of circulating, and evaporating.

7. The process of claim 6 including increasing the sugar concentration of the maple sap to 65-67° Brix by said steps of circulating, and evaporating, and thereby producing maple syrup.

8. The process of claim 5, including increasing the sugar concentration of the maple sap to above 70° Brix by said steps of circulating, and evaporating.

9. The process of claim 8, further comprising, drying the increased sugar concentration maple sap to produce maple sugar subsequently to said step of evaporating.

10. The process of claim 1, further comprising, subsequently to said evaporating water from the maple sap across the membrane, subjecting the increased sugar concentration maple sap to pan evaporation to concentrate the increased sugar concentration maple sap to 65-67° Brix, thereby producing maple syrup.

11. The process of claim 10, further comprising heating the maple sap prior to said circulating using vapor generated by the pan evaporation.

12. The process of claim 1, wherein said pressure below atmospheric pressure is a vacuum of more than 25 inHg.

13. The process of claim 1, further comprising re-introducing gas into the cavity, and repeating the step of removing gas, and thereby increasing and reducing said pressure, during said circulating.

14. The process of claim 13 further comprising repeating said re-introducing gas step and said removing gas step sporadically several times during said circulating.

15. The process of claim 1 wherein said circulating maple sap includes drawing said maple sap from a reservoir, and further comprises conveying the increased sugar concentration maple sap to the reservoir subsequently to said evaporating water from the maple sap across the membrane.

16. The process of claim 1 wherein said membrane is a first membrane, and further comprising, subsequently to said circulating along the first membrane, circulating said increased sugar concentration maple sap along a first side of a second membrane, evaporating water from the increased sugar concentration maple sap across the second membrane, thereby further increasing the sugar concentration.

17. The process of claim 1 wherein said membrane is a first membrane, and further comprises circulating said maple sap along a first side of a second membrane, evaporating water from the maple sap across the second membrane simultaneously to said evaporating water from the maple sap across the first membrane.

18. The process of claim 1, further comprising heating of the maple sap prior to said circulating the maple sap along the first side of the membrane.

19. The process of claim 1 wherein the temperature of the maple sap circulated along the membrane is between 15 and 80° C.

20. The process of claim 1, wherein the temperature of the maple sap circulated along the membrane is between 26 and 49° C.

21. The process of claim 1, wherein said circulating maple sap is performed on maple sap a first sugar concentration and on maple sap at a second sugar concentration, said second sugar concentration being higher than the first sugar concentration, wherein the temperature of the maple sap at said second sugar concentration is higher than the temperature of the maple sap at the first sugar concentration.

22. The process of claim 21 wherein the membrane includes a plurality of membranes, said circulating maple sap at a first sugar concentration is performed on a first one of said membranes, and said circulating maple sap at a second sugar concentration is performed on a second one of said membranes.

23. The process of claim 21 wherein the circulating maple sap at a first sugar concentration and the circulating maple sap at the second sugar concentration are performed on the same membrane, at different points in time.

24. The process of claim 1 further comprising pressurizing the maple sap to less than 100 psi on the first side of the membrane.

25. The process of claim 24 further comprising pressurizing the maple sap to less than 30 psi on the first side of the membrane.

26. The process of claim 1 further comprising condensing the evaporated water, and collecting the evaporated condensed water.

* * * * *